H. TUPPER.
Fare-Box.

No. 6,689. Reissued Oct. 11, 1875.

Witnesses:
D. G. Stuart
L. R. Bart

Inventor:
Horace Tupper
by S. Hannay
Atty.

N. PETERS, PHOTO-LITHOGRAPHER, WASHINGTON, D. C.

132. DEPOSIT & TOLLS ON RECEIVING
Closures and Fastenings
61 Coin Trap, Pivoted,
Rotatable, Turnstile.

2 Sheets--Sheet 2.

H. TUPPER.
Fare-Box.

No. 6,689.

Reissued Oct. 11, 1875.

Witnesses:
D. G. Stuart
L. R. Bart.

Inventor:
Horace Tupper
by L. Hanway
Atty.

N. PETERS, PHOTO-LITHOGRAPHER, WASHINGTON, D. C.

BEST AVAILABLE COPY

UNITED STATES PATENT OFFICE.

HORACE TUPPER, OF BAY CITY, MICHIGAN, ASSIGNOR, BY MESNE ASSIGNMENTS, TO JOHN B. SLAWSON, OF NEW YORK CITY.

IMPROVEMENT IN FARE-BOXES.

Specification forming part of Letters Patent No. 31,755, dated March 19, 1861; reissue No. 6,689, dated October 11, 1875; application filed August 12, 1875.

*To all whom it may concern:*

Be it known that I, HORACE TUPPER, of Bay City, in the county of Bay and State of Michigan, have invented certain new and useful Improvements in Fare-Boxes for Omnibuses, Street-Cars, &c.; and I do hereby declare that the following is a full, clear, and exact description thereof, that will enable others skilled in the art to which it appertains to make and use the same, reference being had to the accompanying drawings, and to the letters of reference marked thereon, which form a part of this specification, and in which—

Figure 2:
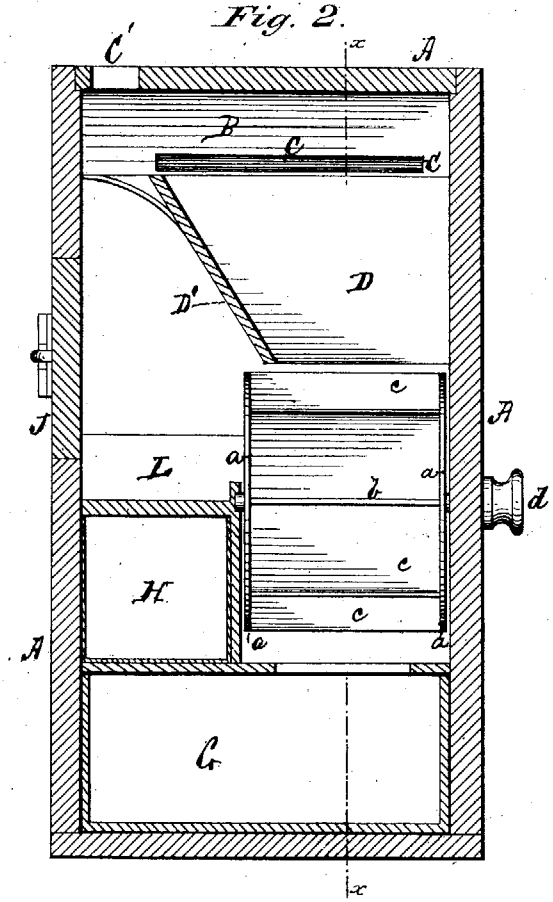
Figure 1:
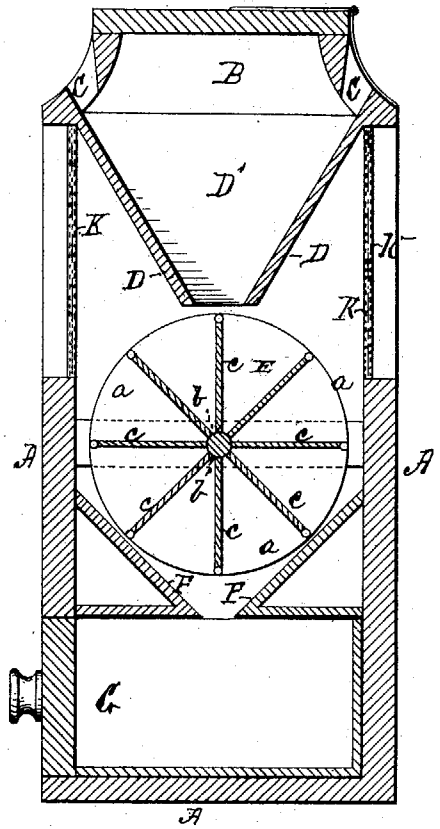
Figure 3:
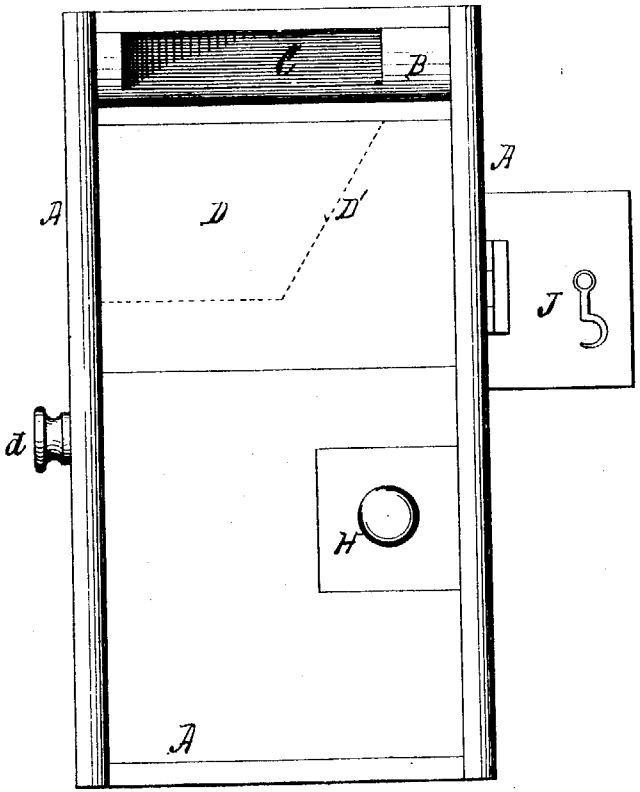

Figure 1 represents a vertical transverse section of a fare-box to which my improvement has been applied, taken through the line *x x* of Fig. 2. Fig. 2 represents a similar sectional view, taken at right angles to the former. Fig. 3 represents a side elevation of my improved box.

Money-boxes have heretofore been constructed in which the money was dropped on or into a horizontally-rotating arrest; but such construction involved the use of complicated devices for operating the arrest and depositing the money, which not only rendered the box costly to build, but constantly liable to get out of order.

My improvement overcomes the difficulties incident to such construction; and consists, first, in constructing the box with a suitable opening or openings through which to deposit the fare in the box, and an opening or openings covered by a transparent medium, through which to inspect it, and combining therewith a rotating receiver, so constructed and arranged as to turn in a vertical plane, and thus present in succession a series of arrests for the different fares as deposited, in order that each may be separately temporarily detained for inspection by the driver or conductor; secondly, in combining with the opening or openings through which the fare is deposited, and with an arrest rotating on a vertical plane for the temporary detention of the fare, a guide slide or slides, so inclined and arranged above the latter as to conduct the fare, as deposited, down to said arrest; thirdly, in combining with the rotating arrest, and with the general receiving-chamber or money-drawer below, a couple of guard-slides, arranged between the two, so as to prevent felonious abstraction of the fare from the money-drawer when once deposited therein; fourthly, in constructing the rotating arrest with glass partitions, in order to facilitate inspection of the fare; fifthly, in combining with a fare-box a box, into which the driver can deposit the passengers' change, an opening through which he can drop it into the box, and a door through which the passengers can remove the change when thus deposited in the box; sixthly, in combining, with a fare-box, a driver's change box or drawer, thereby obviating the necessity for an independent appendage for that purpose.

To enable those skilled in the art to make, construct, and use my invention, I will now proceed to describe its details.

A box of suitable form for the embodiment of my improvements is represented in the drawings, in which—

A represents its outside frame. In the upper end B of this box are arranged three openings, C, C, and C′, two, C C, of which constitute the mouths or passage-ways, through which the passengers deposit their fare, while the other, C′, forms the passage-way or mouth through which the driver passes the change to the passengers by dropping it down into the box or receptacle L, from whence it is taken by the passenger through the door J in the side of the fare-box immediately above receptacle L. Immediately below each of the openings C C is arranged an inclined slide, D, which serves to guide the fare as it is passed through the opening down to the rotating arrest E. The projecting edges of slide D are connected together by another inclined board, D′, to prevent the fare from dropping past arrest E. It also serves to cut off communication between door J and arrest E. These three inclined guides, D, D, and D′, constitute, with the inner side of the wall of the box, a hopper, as it were, for guiding the fare to the rotating arrest E. Partition-board D′ is so arranged with respect to opening C′ as to allow free passage, in a vertical plane, to any change passed through the latter down to box L below. The rotating arrest E con-

BEST AVAILABLE COPY sists of two disks, *a a*, secured to an axis, *b*, which is mounted in suitable bearings formed in one of the walls A of the box, and in the frame-work of box L and driver's change-drawer H. These disks are connected together by a series of partition-plates, *c*, properly secured thereto and to the axis, and thus form a series of arrests for the reception and temporary detention of the fare as deposited through openings C C, the slides D D guiding it down to the arrest. One end of axis *b* passes through and projects beyond the wall of the box, and is provided with a knob, *d*, through which arrest E is turned at the will of the driver. Division-plates *c* are preferably made of glass, to facilitate inspection of the fare, and which is effected by means of openings K K in the sides of the box, each of which is covered or protected by a transparent medium. Immediately below the rotating arrest E are arranged two inclined slides, F F, which converge in a downwardly direction toward each other, and serve to protect the fare already deposited in the locked drawer G, or general receiving-chamber, from felonious depredation, while leaving a space between, through which the fare from the rotating arrest can be deposited in said chamber G. The key of drawer G, like the same of other fare-boxes, is kept under the immediate control of the proprietors of the vehicles, or their authorized agent. A drawer, H, is arranged in the side of the box for the use of the driver, that he may keep his change therein.

The operation is simple. The driver, through knob *d*, turns arrest E, so as to bring the space included between any two adjacent partitions *c* immediately below the converging edges of the inclided slides D D. In this position arrest E is prepared to receive a fare. A fare having been deposited or passed through opening C will be guided down to arrest E by one of the slides D, according to the opening *c* through which it was passed. Having reached arrest E, it is there temporarily detained for inspection by the driver, and by the passenger also, should he so elect. Once inspected, the driver then turns knob *d*, so as to bring the next receiver of arrest E under the hopper for the reception and detention of the fare next deposited, and so on continuously, as occasion may require. Meanwhile the continued rotation of arrest E precipitates the inspected fares down slides F into the drawer G below, where they accumulate until removed by the proper person for the purpose.

A fare-box thus constructed is at once simple and efficient, capable of being built at small cost, and not liable to get out of order, or to be successfully depredated upon.

Having described my invention, what I claim as new and of my invention, and desire to secure by Letters Patent, is—

1. A fare-box provided with an opening, C, through which to deposit the fare in the box, with an inclined guide, D, and with an opening, K, for its inspection, in combination with a rotating receiver, constructed and arranged to turn in a vertical plane, so as to present a series of arrests for the separate and temporary detention of the different fares for inspection, substantially as set forth.

2. A fare-box provided with a rotating arrest turning in a vertical plane, and with an opening, C, and inclined guide, D, substantially as set forth.

3. A fare-box provided with a rotating arrest turning in a vertical plane, and with inclined slide-guards F F, and a locked money-drawer, G, substantially as and for the purposes set forth.

4. The combination, in a fare-box, of the inclined slides D and F with an arrest, E, rotating in a vertical plane, substantially as set forth.

5. A rotating arrest, E, for a fare-box, provided with glass partitions *c*, substantially as and for the purpose set forth.

6. A fare-box provided with an opening, C′, box or receptacle L, and door J, the whole arranged in the manner and for the purposes set forth.

In testimony that I claim the foregoing I have hereunto set my hand this 27th day of July, 1875.

HORACE TUPPER.

Witnesses:
F. E. TYLER,
W. D. MARSH.